US008166246B2

(12) United States Patent
Guthrie et al.

(10) Patent No.: US 8,166,246 B2
(45) Date of Patent: Apr. 24, 2012

(54) CHAINING MULTIPLE SMALLER STORE QUEUE ENTRIES FOR MORE EFFICIENT STORE QUEUE USAGE

(75) Inventors: Guy Lynn Guthrie, Austin, TX (US); Thomas Leo Jeremiah, Hillsborough, NC (US); William Lloyd McNeil, Raleigh, NC (US); Hugh Shen, Round Rock, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1103 days.

(21) Appl. No.: 12/023,600

(22) Filed: Jan. 31, 2008

(65) Prior Publication Data

US 2009/0198867 A1 Aug. 6, 2009

(51) Int. Cl.
*G06F 12/00* (2006.01)
*G06F 13/00* (2006.01)
*G06F 13/28* (2006.01)

(52) U.S. Cl. ............ 711/118; 711/E12.017; 711/E12.02; 711/E12.041; 711/E12.049; 711/E12.052

(58) Field of Classification Search .................. None
See application file for complete search history.

(56) References Cited

U.S. PATENT DOCUMENTS

| | | | | |
|---|---|---|---|---|
| 5,644,752 A * | 7/1997 | Cohen et al. | ................. | 711/122 |
| 5,809,530 A * | 9/1998 | Samra et al. | ................. | 711/140 |
| 5,860,107 A * | 1/1999 | Patel | ............................. | 711/140 |
| 6,658,533 B1 * | 12/2003 | Bogin et al. | .................. | 711/135 |
| 2004/0024971 A1 * | 2/2004 | Bogin et al. | .................. | 711/135 |
| 2006/0129764 A1 * | 6/2006 | Bellows et al. | ............... | 711/125 |
| 2006/0143384 A1 * | 6/2006 | Hughes et al. | ............... | 711/130 |
| 2006/0184771 A1 * | 8/2006 | Floyd et al. | ................... | 712/218 |
| 2008/0104326 A1 * | 5/2008 | Cypher et al. | ................ | 711/122 |
| 2009/0157944 A1 * | 6/2009 | Robinson | ...................... | 711/100 |
| 2009/0282225 A1 * | 11/2009 | Caprioli et al. | .............. | 712/225 |
| 2009/0300294 A1 * | 12/2009 | Moyer et al. | .................. | 711/144 |
| 2009/0300338 A1 * | 12/2009 | Caprioli et al. | .............. | 712/228 |
| 2010/0125707 A1 * | 5/2010 | Cypher et al. | ................ | 711/145 |
| 2010/0153655 A1 * | 6/2010 | Cypher et al. | ................ | 711/139 |

OTHER PUBLICATIONS

IBM Technical Disclosure Bulletin NN9009284, "Chained Store Operations for Improved Main Store Performance", Sep. 1990 US, vol. 33, Issue 4, pp. 284-286. (pages referred to as provided in pdf pp. 1-3).*

* cited by examiner

*Primary Examiner* — Edward Dudek, Jr.
*Assistant Examiner* — Matthew Chrzanowski
(74) *Attorney, Agent, or Firm* — Yee & Associates, P.C.; Matthew B. Talpis

(57) ABSTRACT

A computer implemented method, a processor chip, a data processing system, and computer program product in a data processing system process information in a store cache of a data processing system. The store cache receives a first entry that includes a first address indicating a first segment of a cache line. The store cache then receives a second entry including a second address indicating a second segment of the cache line. Responsive to the first segment not being equal to the second segment, the first entry is chained to the second entry.

13 Claims, 8 Drawing Sheets

CHAINING MULTIPLE SMALLER STORE QUEUE ENTRIES FOR MORE EFFICIENT STORE QUEUE USAGE

This invention was made with United States Government support under Agreement No. HR0011-07-9-0002 awarded by DARPA. THE GOVERNMENT HAS CERTAIN RIGHTS IN THE INVENTION.

BACKGROUND

1. Field of the Invention

The present invention relates generally to data processing systems and specifically to processing store operations within a processor chip. Still more particularly, the present invention relates to an improved system and method of dispatching operations within a processor chip for more efficient store queue usage.

2. Description of the Related Art

A queue is a data structure in which elements are removed in the same order they were entered. That is, elements of the queue are removed in a first in, first out (FIFO) arrangement. Queues perform the function of a buffer, providing a data structure where various entities such as data, objects, persons, or events are stored and held to be processed later. Queues are common in computer programs, where they are implemented as data structures coupled with access routines, as an abstract data structure or in object-oriented languages as classes. Common implementations are Circular buffers and Linked lists.

A store queue in a level 2 (L2) cache operates on a set data granularity, with each entry able to gather up to a set data size, for example, 128 bytes. A level 1 (L1) cache is a memory bank built into the CPU chip. A level 2 cache (L2) is a secondary staging area that feeds the L1 cache. As operations are received by the store queue, they are gathered into a store queue entry for dispatch to a read-claim machine. A read-claim machine handles memory access requests issued from the processor. "Gathering" is the processes of entering multiple operations into a single store queue entry. If an entry is not fully gathered into, the unused portion of the entry is wasted until the store queue entry is dispatched to the read-claim machine to be committed into the cache.

In a worst case example, an eight (8) entry 128 byte store queue receives eight random 1-byte stores such that none of the 8 stores are within 128 bytes of another store. The 8 entry 128 byte store would allocate one (1) 128 byte entry for each store operation, wasting the other 127 bytes per entry. The processor core would then be stalled waiting for at least one (1) of the 8 used entries to be dispatched to a read-claim machine before sending the next store operation. Processor stalling of this type is common in a business workload.

A possible solution to the under usage of store queue entry space problem is to have more store queue entries. Each store queue entry could then hold smaller amounts of data, which are dispatched more frequently to the read-claim machine. Each store queue entry dispatches individually to a read-claim machine in order to commit its portion of data. However, if the store stream from the processor core is very ordered, multiple store queue entries would have to be dispatched to multiple read-claim machines in order to commit the same amount of data as the large store queue entries.

SUMMARY

A computer implemented method, a processor chip, a data processing system, and computer program product in a data processing system process information in a store cache of a data processing system. The store cache receives a first entry that includes a first address indicating a first segment of a cache line. The store cache then receives a second entry including a second address indicating a second segment of the cache line. Responsive to the first segment not being equal to the second segment, the first entry is chained to the second entry.

BRIEF DESCRIPTION OF THE DRAWINGS

The novel features believed characteristic of the illustrative embodiments are set forth in the appended claims. The illustrative embodiments themselves, however, as well as a preferred mode of use, further objectives and advantages thereof, will best be understood by reference to the following detailed description of the illustrative embodiments when read in conjunction with the accompanying drawings, wherein:

DETAILED DESCRIPTION OF THE PREFERRED EMBODIMENT

The invention provides a method and a processor-chip design/configuration by which certain store operations may bypass other store operations that are stalled and unable to dispatch to a read-claim machine due to address collisions with other read-claim or snoop machines. The invention enables more efficient processing of store queue entries to reduce the likelihood of processor stalls resulting from a backlog of store queue entries. The invention involves some enhancements and/or additions to the store queue mechanism including changes in the store queue controller to prevent repeated selection of a group of entries by the arbitration logic.

Figure 1:
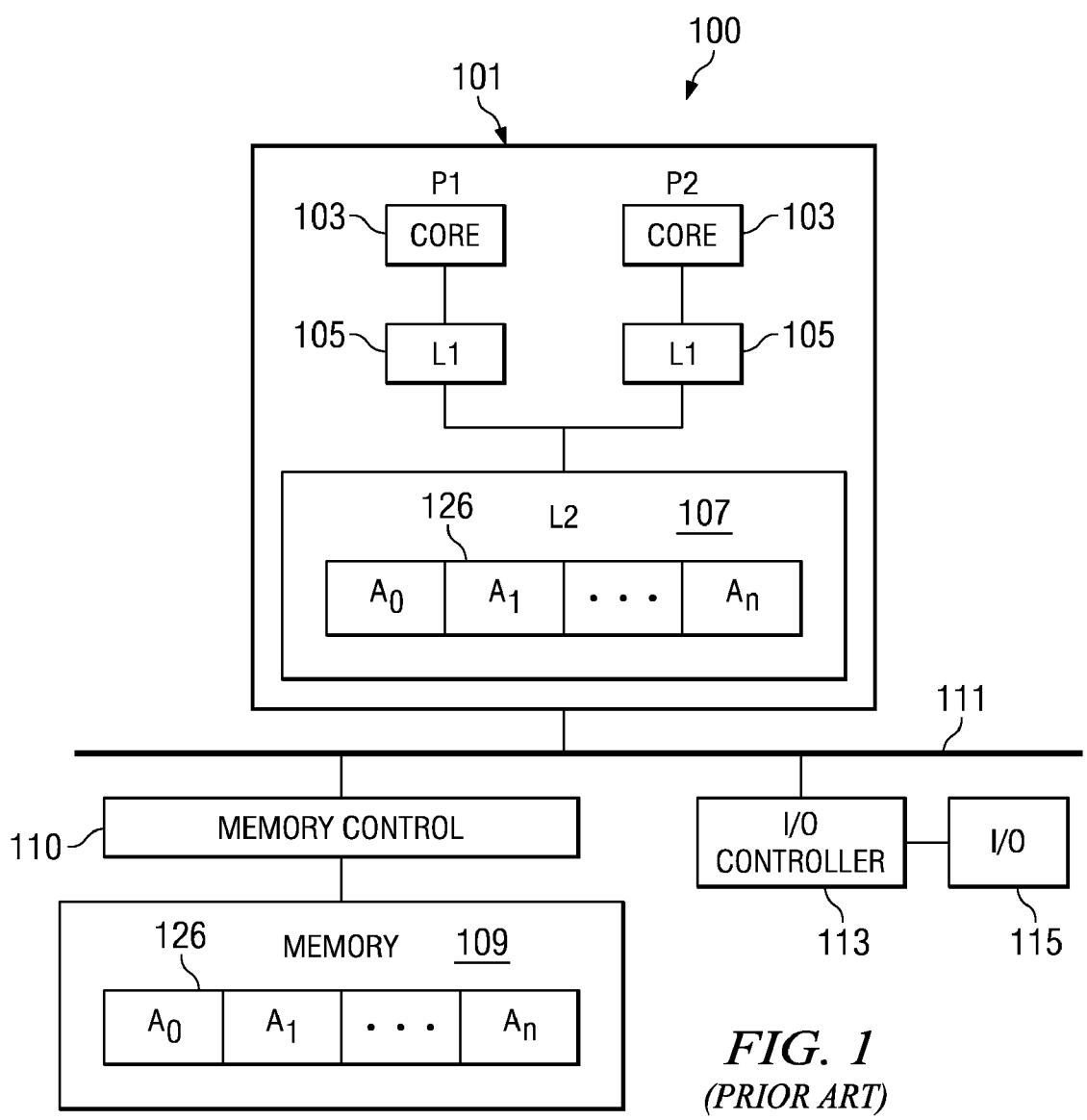
FIG. 1 is diagram a multi-processor data processing system (MP) 100 in which illustrative embodiments can be implemented.

With reference now to the figures and in particular, with reference to FIG. 1, there is illustrated a multi-processor data processing system (MP) 100 in which illustrative embodiments can be implemented. Multi-processor data processing system 100 comprises several major components including processor chips 101, memory 109 and input/output device(s) 115. Input/output device(s) 115 have an associated input/output controller 113. Memory 109 has an associated memory control 110 that controls access to and from memory 109.

Processor chips 101 are connected to memory 109 and input/output device(s) 115 via interconnect (system bus) 111 by which processor chips 101 communicate with each other and with memory 109, input/output device(s) 115, and other peripheral devices. Interconnect 111 is a bifurcated bus with a data bus for routing data and a separate address bus for routing address transactions and other operations.

Processor chips 101 each contain two processor cores 103, and onboard level one (L1) caches 105 and shared L2 cache 107. According to the present invention, L2 caches 107 support intervention. Further, each cache is designed with a cache directory, an array of cache lines, and all data operations at each cache are completed according to a cache coherency protocol.

The various features of the invention are carried out by logic components on processor chips 101 and affect buffering of store operations at the store queue and selection of entries for dispatch. For illustrative purposes, a sample cache line is provided within L2 cache, and the invention is described from the perspective of updating a cache line (A) in the L2 cache with store operations issued by a processor core and temporarily buffered in a store queue entry.

As illustrated within L2 cache 107 of FIG. 1, exemplary cache line A 126 may contain multiple blocks/granules of data, corresponding to individual bytes, words, double words, etc., each of which may be the target of an update by a processor-issued store operation. The specific size of each cache line 126 and number of updateable data blocks/granules may differ from system to system, and the exact parameters utilized within the invention are adjusted accordingly to provide the general functionality described herein. While the present invention is described with specific reference to the L2 cache within a multi-level cache architecture, it is understood that the cache architecture need not be a multi-level one.

The present invention is described with reference to multi-processor data processing system 100 and component parts of multi-processor data processing system 100 illustrated by FIG. 1 and FIG. 4 (described below), but the present invention may be applied to different configurations of data processing systems that are not necessarily conventional. As an example, the invention may be implemented within a non-uniform memory access (NUMA) system. With this type of memory access, the system memory (RAM) is divided among two or more memory arrays (having separate memory controllers connected to the system bus) and allocated among the processing units. Also, multi-processor data processing system 100 could include new hardware components not shown in FIG. 1, or have a novel interconnect architecture for existing components. Multi-processor data processing system 100 may also have a different number of processing units. Those skilled in the art will therefore appreciate that the present invention is not limited to the generalized system showing in FIG. 1.

Figure 2:
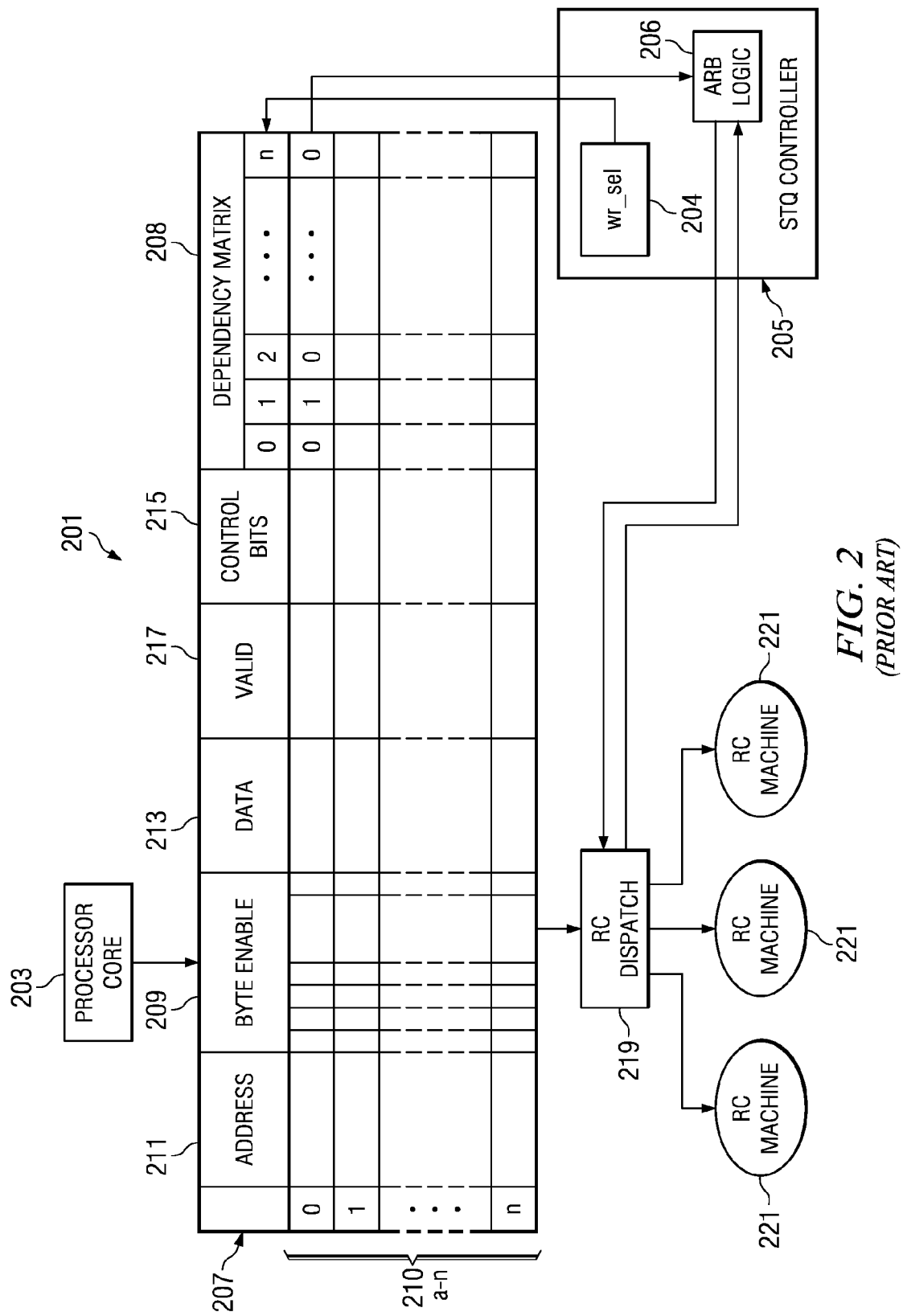
FIG. 2 is diagram of known hardware and logic components of a processor chip that are utilized to complete data store operations.

Referring now to FIG. 2, a diagram of known hardware and logic components of a processor chip that are utilized to complete data store operations are shown. As illustrated, processor chip 201 includes a processor core 203, store queue 207 with store queue (STQ) controller 205, and read-claim (RC) dispatch logic 219. Store queue (STQ) controller 205 includes write pointer 204 and arbitration logic 206. Write pointer 204 and arbitration logic 206 select entries within store queue 207. The operation of both write pointer 204 and arbitration logic 206 are discussed herein in more detail in conjunction with FIGS. 3-5. Read-claim dispatch logic 219 supports a series of read-claim machines 221, which complete the actual data store operations at the lower-level cache (not shown).

Store queue (STQ)controller 205 includes a write select pointer 204 and arbitration logic 206. Write select pointer 204 selects empty entries to hold new store operations when processor core 203 sends new store operations to store queue 207 that do not gather into an existing entry. While those skilled in this art will appreciate that write select pointer 204 can utilize any appropriate algorithm to select an empty store queue entry, such as with a priority encode algorithm that enables write select pointer 204 to select an empty entry from any entry with a valid bit set to "0." A valid bit set to "0" indicates that an entry may be overwritten.

Arbitration logic 206 examines store queue 207 for eligible entries that read-claim dispatch logic 219 can dispatch to read-claim machines 221. A store queue entry 210a-n is eligible for transmission to read-claim dispatch logic 219 when the dependency matrix row corresponding to the particular store queue entry indicates that all dependencies are cleared out.

Store queue 207 provides several rows (entries) for temporarily storing and tracking processor-issued stores. Each row is divided into several columns that provide byte enable register 209, a collection of entries 210a-n, address register 211, data register 213, control bits 215, and valid bit 217. Data register 213 and address register 211 store data issued from processor core 203 and the corresponding memory address, respectively.

Store queue 207 also includes a dependency matrix 208 consisting of n-by-n bits. Each row represents each store queue entry's dependencies on other store queue entries. A "1" in a row indicates that the entry corresponding to that row cannot be dispatched until the entry corresponding to the column with the "1" has already dispatched. For example, store queue entry 0 is dependent on store queue entry 1, and store queue entry 0 cannot be dispatched before store queue entry 1 has been cleared for dispatch.

Byte enable register 209 includes a number of bookkeeping bits. Conventionally, the number of bits corresponds to the number of individually addressable storage granules within a cache line. Each bit corresponds to a smallest size of store granule within data register 213. Thus, for example, for a 128-byte cache line entry and byte store operations, byte enable register 209 maintains 128 bits for tracking single-byte processor-issued stores. This enables tracking of specific bytes (or group of bytes) within a 128-byte cache line entry that is being updated by processor core 203. For simplicity, the present invention will be described with cache lines having a length/capacity of 128-bytes that are updated via a plurality of processor-issued store operations, although cache lines having different length/capacity can also be utilized.

Valid bit 217 indicates to store queue (STQ) controller 205 when data within a particular row of store queue 207 is valid, and valid bit 217 is checked before a row of data (or an entry) is forwarded to read-claim dispatch logic 219. Once a valid bit is set, the row of data (or an entry) is selectable regardless of whether additional stores to that cache line are being sent by processor core 203. Control bits 215 represent an assortment of additional bits that are utilized by store queue (STQ) controller 205. The functionality of several of the above-described columns is referenced within the description of the data store operations below.

Store operations typically originate at processor core 203 and are temporarily stored in an entry of store queue 207. The store operations target a particular cache line or portion of the cache line identified by the address within the store operation. The operation also provides data to be stored within the addressed portion of that cache line.

The store operations update particular bytes within the cache line entry. Concurrent with these data updates, corresponding bits within byte enable register 209 are set to track which bytes within the cache line entry have been updated by store operations. Typically, a series of store operations writing to a same entry in the store queue are absorbed by the store queue entry before the line is dispatched to the L2 cache. This absorption of multiple store operations into a single entry is referred to as "gathering" stores, since multiple different stores addressing the same cache line are "gathered" into an entry of the store queue buffer before the line is presented to the L2 cache for storage.

Figure 3:
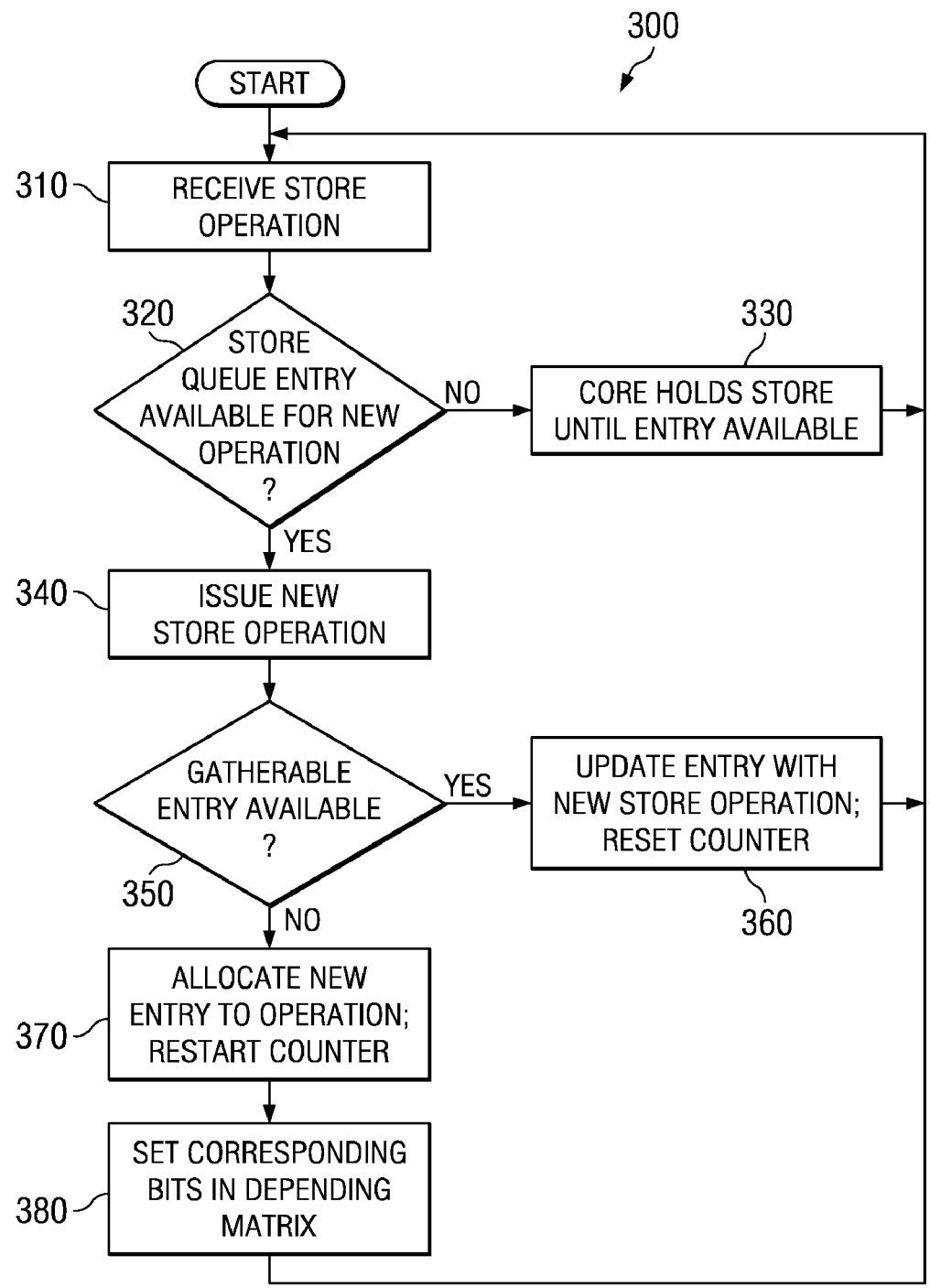
FIG. 3 is a high-level logical flowchart for writing a new store queue entry in response to a store queue receiving a new store operation from a processor core according to the prior art.

Referring now to FIG. 3, a high-level logical flowchart for writing a new store queue entry in response to a store queue receiving a new store operation from a processor core is shown according to the prior art. Process 300 is a write process occurring on processor chip 201 of FIG. 2.

Process 300 begins by receiving a store operation from a processor core (step 310). Responsive to receiving the store operation, process 300 determines if a store queue entry is available for the new store operation (step 320). A store queue entry is available if empty entries are available to hold the new store operation.

If process 300 determines that a store queue entry is not available for the new store operation ("no" at step 320), process 300 sends a message instructing the processor core to halt the sending of store operations until some entries have been dispatched by read-claim dispatch logic (step 330). The processor core then holds store operations for that store queue until an entry in the store queue becomes available.

If process 300 determines if a store queue entry is available for the new store operation (step 330), the process 300 issues the new store operation (step 340). When the store queue receives the store operation, process 300 determines whether a gatherable entry for the same cache line address is currently available for gathering the store operation (step 350). A gatherable entry is a preexisting entry in the in the store queue which is still gathering operations. Gathering of store operations involves a series of store operations writing to the same cache line in the store queue that are absorbed by the store queue entry before the line is dispatched to the L2 cache, as previously described. If process 300 determines that gatherable entry is available for the new store operation ("yes" at step 350), process 300 updates the gatherable entry with data of the new store operation and resets a gather counter (step 360). Process 300 then returns to step 310 and continues in an iterative fashion.

The gather counter is a cycle or clock counter. A gather counter is provided for each entry in the storage queue. The gather counter prevents entries in the store queue from languishing indefinitely while the store queue controller attempts to completely fill each data register within the entry. Once the gather counter has reached a predetermined number of counts, the associated entry in the store queue is processed for dispatch, despite the possible existence of data registers therein which are not completely filled.

Returning to step 350, if process 300 determines that a gatherable entry for the new store operation does not exist ("no" at step 350), process 300 selects an empty entry to allocate the new store operation, and allocates data corresponding to the new store operation in the empty entry (step 370). The new data, address, and byte enable data corresponding to the new store operation is inserted into the new store queue entry.

Process 300 then sets corresponding bits in the dependency matrix (step 380). Process 300 then returns to step 310 and proceeds in an iterative fashion. The bits set in the dependency matrix correspond to valid entries in the store queue having a dependent relationship with the new entry (where the new entry is dependent on the other valid entries). A new entry is dependent on another store queue entry if, among other things, the store operation characterized by the new entry requires an access to the same address as the other store queue entry or must be synchronized with the other store queue entry's store operation. For example, as earlier described in conjunction with FIG. 2, if for a new store operation, write select pointer 204 updates store queue entry 0, and store queue (STQ) controller 205 determines that entry 0 is dependent on entry 1, store queue (STQ) controller 205 will enter a "1" into row 0, column 1 of dependency matrix 208 while entering a "0" in the rest of the columns in row 0, provided that entry 0 is not dependent on any other entry in store queue (STQ) 207.

Figure 4:
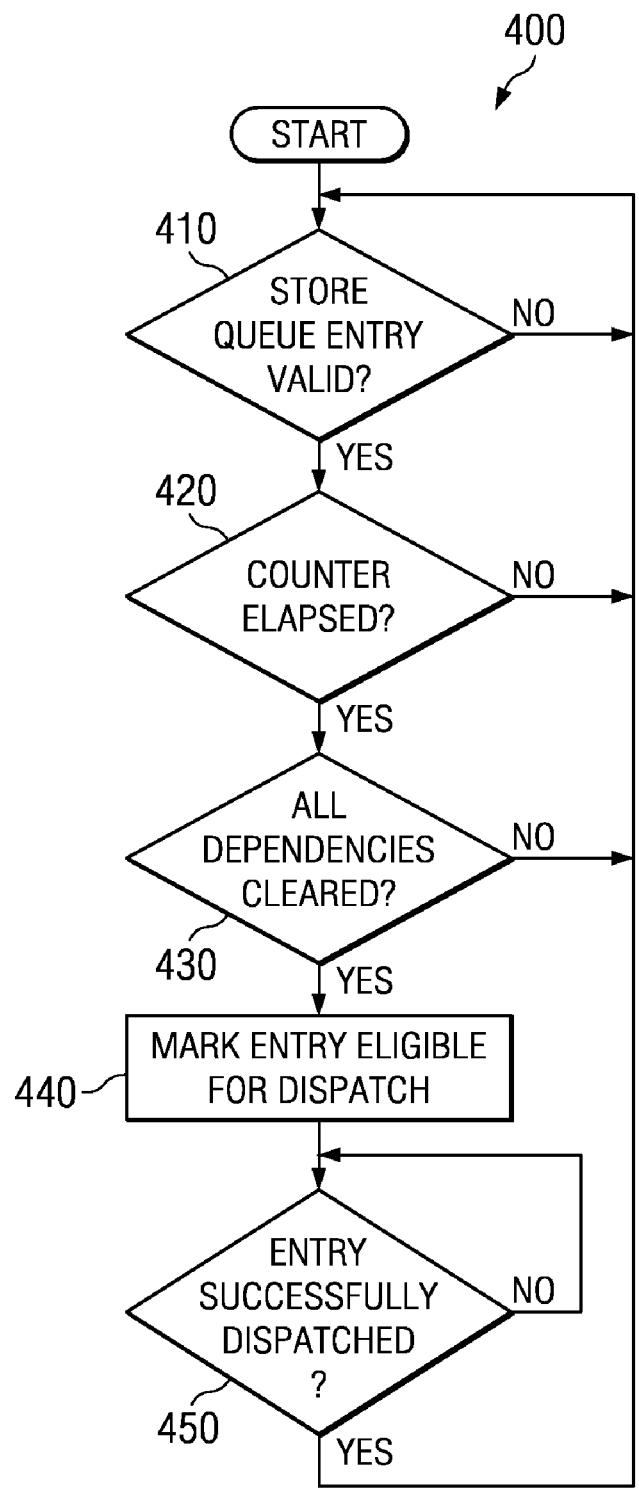
FIG. 4 is a high-level logical flowchart illustrating a method of determining whether a specific entry in a store queue is eligible for dispatch by a store queue controller according to the prior art.

Referring now to FIG. 4, a high-level logical flowchart illustrating a method of determining whether a specific entry in a store queue is eligible for dispatch by a store queue controller is shown according to the prior art. Process 400 is run in parallel with all store queue entries. That is, a process such as process 400 runs for each store queue. Process 400 executes on a store queue controller, such as store queue (STQ) controller 205 of FIG. 2.

Process 400 begins by determining whether a particular store queue entry is valid (step 410). According to one illustrative embodiment, process 400 determines the validity of a particular entry by examining the contents of the associated valid bit field for the particular store queue entry. If process 400 determines that the store queue entry is not valid ("no" at step 410), then the process returns to step 410 and proceeds in an iterative fashion.

Returning again to step 410, if process 400 determines that the store queue entry is valid ("yes" at step 410), process 400 determines whether the gather counter has elapsed (step 420). The elapsing of the gather counter prevents entries in the store queue from languishing indefinitely while the store queue controller attempts to completely fill each data register within the entry. The gather counter may specify a period of time required for the gathering of store operations into a specific entry. When this specified period has elapsed, the store controller will determine that the entry has completed gathering of enough store operations for dispatch.

As previously described, the gathering of store operations involves a series of store operations writing to the same cache line being absorbed by the store queue entry before being dispatched to the read-claim machines. While the illustrated embodiment utilizes a gather counter, those with skill in this art will appreciate that store queue controller may utilize any method to determine if the entry has finished gathering associated store operation.

If process 400 determines that the gather counter has not yet elapsed ("no" at step 420), the process iterates back to step 410. However, if process 400 determines that the gather counter has elapsed ("yes" at step 420) and therefore that the entry has finished gathering, process 400 determines whether or not all the dependencies associated with the store queue entry have been cleared (step 430).

As detailed above, the store queue includes a dependency matrix consisting of n-by-n bits, where n is the number of entries in the store queue. Each row represents each store queue entry's dependencies on other store queue entries. A "1" in a row indicates that the entry corresponding to that row cannot be dispatched until the entry corresponding to the column with the "1" has already dispatched. For example in FIG. 2, store queue entry 0 is dependent on store queue entry 1, and store queue entry 0 cannot be dispatched before store queue entry 1 has been cleared for dispatch.

If all the dependencies associated with the entry have not been cleared ("no" at step 430), process 400 returns to step 410 and proceeds in an iterative fashion. However, if process 400 determines that all the associated dependencies for the entry have been cleared ("yes" at step 430), process 400 marks the entry as available for dispatch (step 440). The entry can then be dispatched to a read-claim machine to be committed into the cache for execution.

Process 400 continues by determining whether the entry has been successfully dispatched (step 450). As previously discussed, when read-claim dispatch logic, such as read-claim dispatch logic 219 of FIG. 2, has successfully dispatched an entry to a read-claim machine, read-claim dispatch logic sends a "dispatch complete" signal to the store queue controller.

If the entry has not been successfully dispatched ("no" at step 450), process 400 iterates at step 450. However, if the entry has been successfully dispatched ("yes" at step 450), process 400 returns to step 410 and continues in an iterative fashion.

Figure 5:
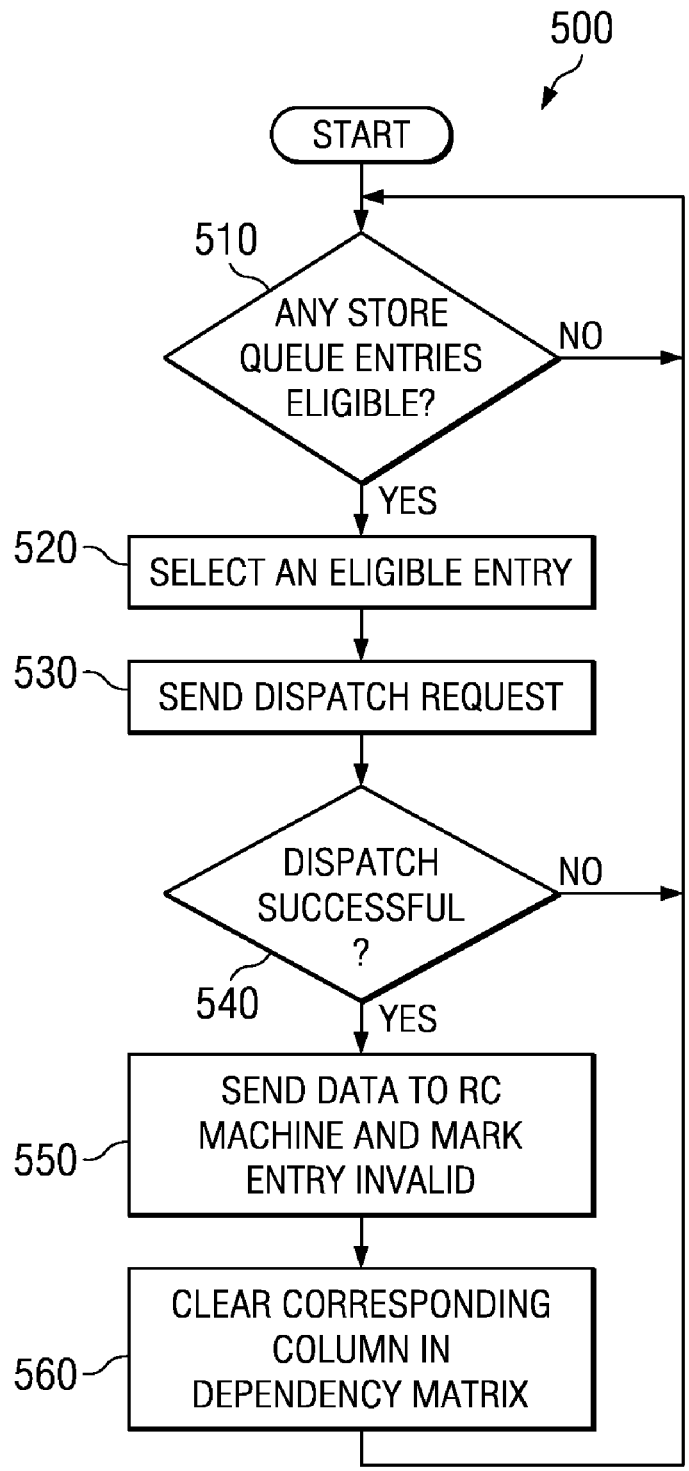
FIG. 5 is a high-level logical flowchart depicting the operation of arbitration logic to request a single store queue entry to be dispatched according to the prior art.

Referring now to FIG. 5, a high-level logical flowchart depicting the operation of arbitration logic to request a single store queue entry to be dispatched is shown according to the prior art. Process 500 executes on a store queue controller, such as store queue controller 205 of FIG. 2. Process 500 is an example of arbitration logic 206 of FIG. 2.

Process 500 begins by determining if any store queue entries are eligible for dispatch (step 510). As previously discussed, a store entry is eligible for dispatch when (1) the valid bit is set; (2) the store queue controller has determined that the entry has completed gathering associated store operations; and (3) all dependencies related to the entry have been cleared (e.g., all values in the entry's associated row in the dependency matrix, such as dependency matrix 208 of FIG. 2, have been set to "0").

If process 500 determines that no entries in the store queue are available for dispatch ("no" at step 510), process 500 iterates at step 510. However, if at least one entry in the store queue is available for dispatch ("yes" at step 510), process 500 selects an eligible entry for dispatch (step 520). Those skilled in this art will appreciate that any selection algorithm may be utilized to select one eligible entry for dispatch. Some examples of commonly utilized algorithms are round-robin or random, but are not limited to these algorithms.

Process 500 then sends a dispatch request to the read-claim dispatch logic (step 530). The dispatch request requests the dispatch logic to dispatch the entry to a read-claim machine to be committed into the cache for execution.

Process 500 then determines whether the dispatch of the entry was successful (step 540). As previously discussed, the read-claim dispatch logic sends a "dispatch complete" signal to the store queue controller after a successful dispatch of a store operation associated with an entry in the store queue.

If process 500 determines that the dispatch of the entry is not successful ("no" at step 540), process 500 returns to step 510 and proceeds in an iterative fashion. If, however, process 500 determines that the dispatch of the entry was successful ("yes" at step 540), process 500 then sends the data associated with the entry to a read-claim machine for processing, and marks the dispatched entry as invalid in the associated valid bit field (step 550). Process 500 then clears the column in dependency matrix (step 560), returns to step 510 and proceeds in an iterative fashion.

Thus, the illustrative embodiments allow for smaller sized store queue entries to be chained together so that they can act as one large sized entry or as multiple individual entries dynamically. This allows for the store queue to allocate a greater number of smaller queue entries when the processor is doing a random workload. Conversely, when the processor is doing scientific workloads where the store stream is ordered, multiple queue entries can be chained together to dispatch into one read-claim machine. Allowing the store queue to dynamically allocate entries and chaining them as needed results in less wasted store queue buffers space and the flexibility to change between random and scientific workloads.

Each store queue is a smaller size than a full cache line, with the ability to chain enough entries up to a full cache line worth of data. Chaining is implemented with the addition of a pointer to each store queue entry. The pointer can point to any other new entry in the store queue, including itself. When a new entry is allocated by the store queue, the new entry sets its pointer to point at itself. The new entry is now considered a "master" entry. If the new entry can chain with an existing older entry or entries, then the point is set to the same value as the entry's (or entries') pointer values. Since all entries that cluster together will always have their pointers pointing at the master entry there is no conflict.

The dependency vector is a vector of all the valid entries an entry is ordered against based on architectural ordering rules. The rules dictate which entry must be dispatched to the read-claim machines first before entry is eligible to dispatch. With store chaining, all chained entries are dependent on the master entry. This means only the master entry can make a dispatch request to the read-claim machines. When the master entry makes a dispatch request to the read-claim machines, the entry looks up all the entries with itself as the pointer and sends the read-claim machine the master entry and all chained entries dispatches to the read-claim together and is de-allocated from the store queue.

Figure 6:
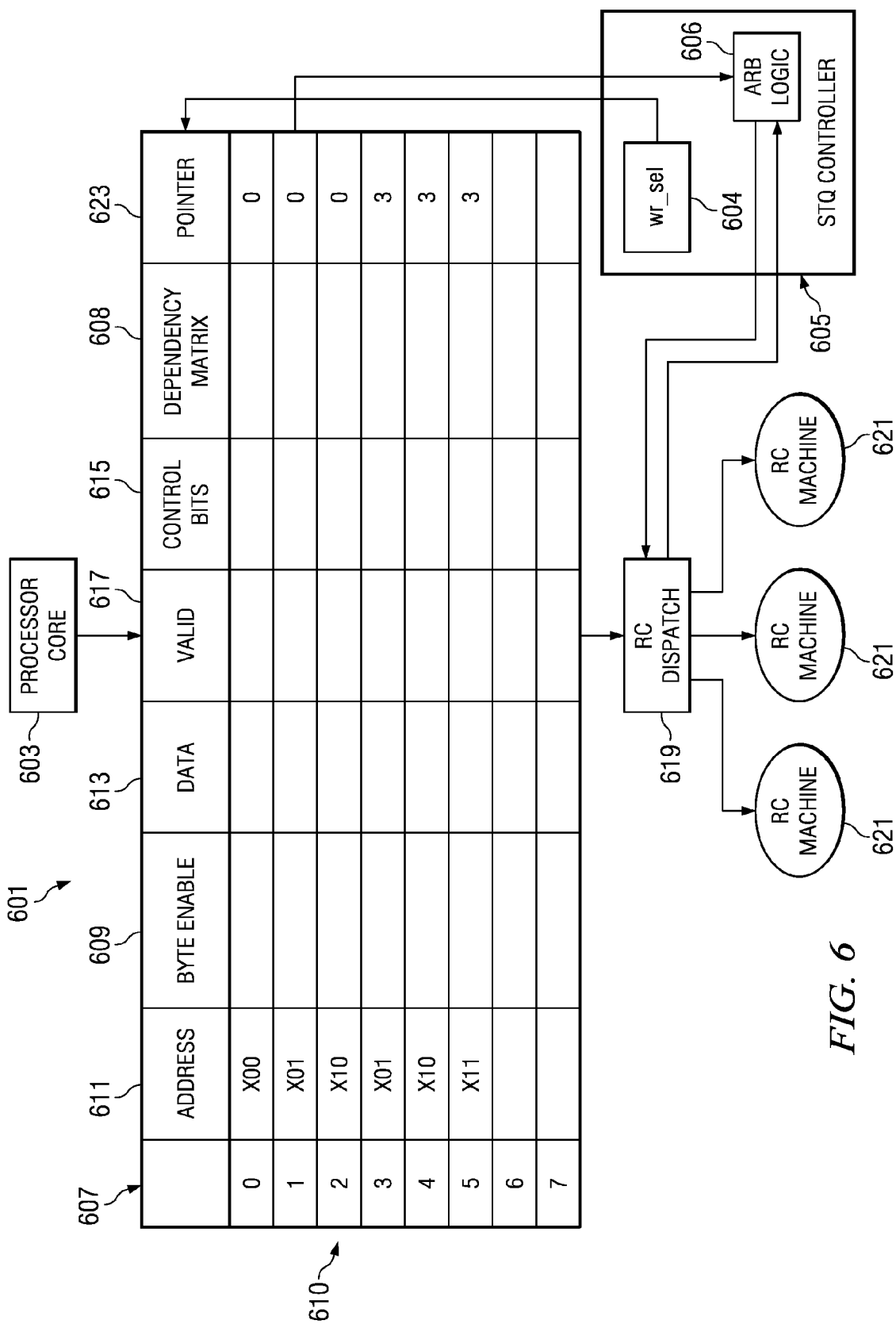
FIG. 6 is diagram of specific hardware and logic components of a processor chip utilized to complete data store operations according to an illustrative embodiment.

Referring now to FIG. 6, a diagram of specific hardware and logic components of a processor chip utilized to complete data store operations are shown according to an illustrative embodiment. Processor chip 601 includes the specific hardware and logic components of processor chip 201 of FIG. 2. As illustrated, processor chip 601 includes a processor core 603, store queue 607 with store queue (STQ) controller 605, and read-claim (read-claim) dispatch logic 619. Store queue controller 605 includes write pointer 604 and arbitration logic 606 for selecting entries within store queue (STQ) 607. The use of write pointer 604 and arbitration logic 606 are discussed herein in more detail in conjunction with FIGS. 7-8. Read-claim dispatch logic 619 supports a series of read-claim machines 621, which complete the actual data store operations at the lower-level cache (not shown). Additionally, processor chip 601 includes pointer 623.

Entries in store queue 607 can contain at a maximum, a segmented fraction of the maximum cache line size utilizable by read-claim machine 621. Processor core 603 designates each entry sent therefrom to be gathered into a specific segment of a cache line by entry addresses to be stored in address register 611. The inclusion of additional address bits indicates the designated segment which segment of the cache line the new entry is intended.

Because each entry is smaller than the maximum cache line size utilizable by read-claim machine 621 and is designated for a specific sub-divided segment, addresses within address register 611 require additional bits to identify the stored location of the new entry than does address register 211 of FIG. 2. Therefore, for example, if the size of each entry in store queue 607 is 25 percent of the maximum cache line size utilizable by read-claim machine 621, address within address register 611 would require two extra bits as compared to the addresses within address register 211 of FIG. 2 in order to specify for which segment of the cache line the entry is valid.

If the size of each entry in store queue 607 is 12.5 percent of the maximum cache line size utilizable by read-claim machine 621, address register 611 would need three extra bits as compared to address register 211 of FIG. 2 in order to specify for which segment of the cache line the entry is valid.

When the store queue receives a store operation from the processor, a comparison is made of the address register 611 for the new entry against all of the existing entries 610 in store queue 607 to determine whether any of the address register 611 for existing entries matches the address of the new entry. If the address for the new entry matches an existing entry 610, store queue controller 605 can gather the new entry into the existing entry, if the existing entry is still gathering. If the new entry cannot be gathered, store queue controller 605 enters the new entry as a separate entry in entries 610.

When store queue controller 605 enters a new entry into store queue 607, store queue controller 605 determines whether the new entry in entries 610 can be chained to any of the existing entries of entries 610. The new entry can not be chained to an existing master entry with an address in address register 611 that designates an identical specific segment of a cache line as the new entry. Furthermore, the new entry can not be chained to an existing master entry where the master entry is already chained to an entry with an address in address register 611 that designates an identical specific segment of a cache line as the new entry.

For purposes of this illustrative embodiment, it is assumed that entries in store queue 607 are received from processor core 603 in sequential order. However, it is recognized that the exact order is arbitrary. The relative order in which the entries are received is provided for illustrative purposes.

Entry 0 in store queue 607 has an address of X00. When store queue 607 initially receives entry 0, the address X00 does not match the address for any other entry in address register 611. Also, there are no other entries in store queue 607 onto which entry 0 can chain. Therefore, entry 0 is designated as a "master" entry. A master entry is the first entry of a new cache line, regardless of the specific segment indicated. Store queue controller 605 sets the pointer in pointer register 623 for entry 0 to identify itself. That is, store queue controller 605 sets a pointer for a master entry to point to that master entry.

Entry 1 of store queue 607 has an address of X01. When store queue 607 initially receives entry 1, the address X01 does not match the address for any other entry in address register 611. However, the address X01 for entry 1 indicates a specific segment different from that of entry 0. Therefore, entry 1 can be chained to entry 0. Because entry 1 can be chained to entry 0, store queue controller 605 sets the pointer for entry 1 in pointer register 623 to identify entry 0. That is, store queue controller 605 sets a pointer for a chained entry to point to the master entry to which the chained entry is chained.

Entry 2 of store queue 607 has an address of X10. When entry 2 is initially received, the address X10 does not match the address for any other entry in address register 611. However, the address X10 for entry 2 indicates a specific segment different from that of entry 0 and entry 1. Therefore, entry 2 can be chained to entry 0. Therefore, store queue controller 605 sets the pointer in pointer register 623 for entry 1 to identify entry 0.

Entry 3 of store queue 607 has an address of X01. When store queue 607 initially receives entry 3, the address X01 for entry 3 matches the address for entry 1 in address register 611. If entry 1 were still gathering, store queue controller 605 could gather entry 3 into entry 1. When the gather counter of one entry expires, the gather counters for all associated chained entries expires. Thus the expiration of one gather counter will cease gathering for all chained entries and prevents further chaining. Entry 1 has stopped gathering. Therefore, store queue controller 605 enters entry 3 as a new entry into store queue 607. Because the address X01 for entry 3 matches the address for entry 1, entry 3 cannot be chained to entry 0. Therefore, store queue controller 605 designates entry 3 as a "master" entry. The pointer for entry 3 in pointer register 623 is set to identify itself, entry 3.

Entry 4 of store queue 607 has an address of X10. When store queue 607 initially receives entry 4, the address X10 for entry 4 matches the address for entry 2 in address register 611. If entry 2 were still gathering, store queue controller 605 could gather entry 4 into entry 2. However, entry 2 has stopped gathering. Therefore, store queue controller 605 enters entry 4 as a new entry into store queue 607. Because the address X10 for entry 4 matches the address for entry 2, store queue controller 605 cannot chain entry 4 to entry 0. However, store queue controller 605 can chain entry 4 to entry 3. The address X10 for entry 4 indicates to store queue controller 605 a specific segment different from that of entry 3. Therefore, store queue controller 605 can chain entry 4 to master entry 3. Store queue controller 605 sets the pointer in pointer register 623 for entry 4 to identify entry 3.

Entry 5 of store queue 607 has an address of X11. When store queue 607 initially receives entry 5, the address X11 does not match the address for any other entry in address register 611. The address X11 for entry 5 indicates to store queue controller 605 a specific segment different from that of entry 0, entry 1, and entry 2. Because the gather counter for entries 0, 1, and 2 has expired, store queue controller 605 cannot gather entry 5 into those chained entries. However, the address X11 for entry 5 indicates a specific segment different from that of entry 3, and entry 4. Therefore, store queue controller 605 can chain entry 5 to entry 3. Store queue controller 605 sets the pointer in pointer register 623 for entry 5 to identify entry 3. That is, store queue controller 605 sets a pointer for a chained entry to point to the master entry to which the chained entry is chained.

With store chaining, all chained entries are dependent on the master entry. Store queue controller 605 can make a dispatch request to the read-claim machines for only the master entries. When the store queue controller 605 makes a dispatch request of a the master entry to the read-claim machines, store queue controller 605 looks up all the entries pointing to the master entry and sends the read-claim machine the master entry and all chained entries. Store queue controller 605 dispatches the chained entries to the read-claim together and de-allocates the chained entries from the store queue.

Figure 7:
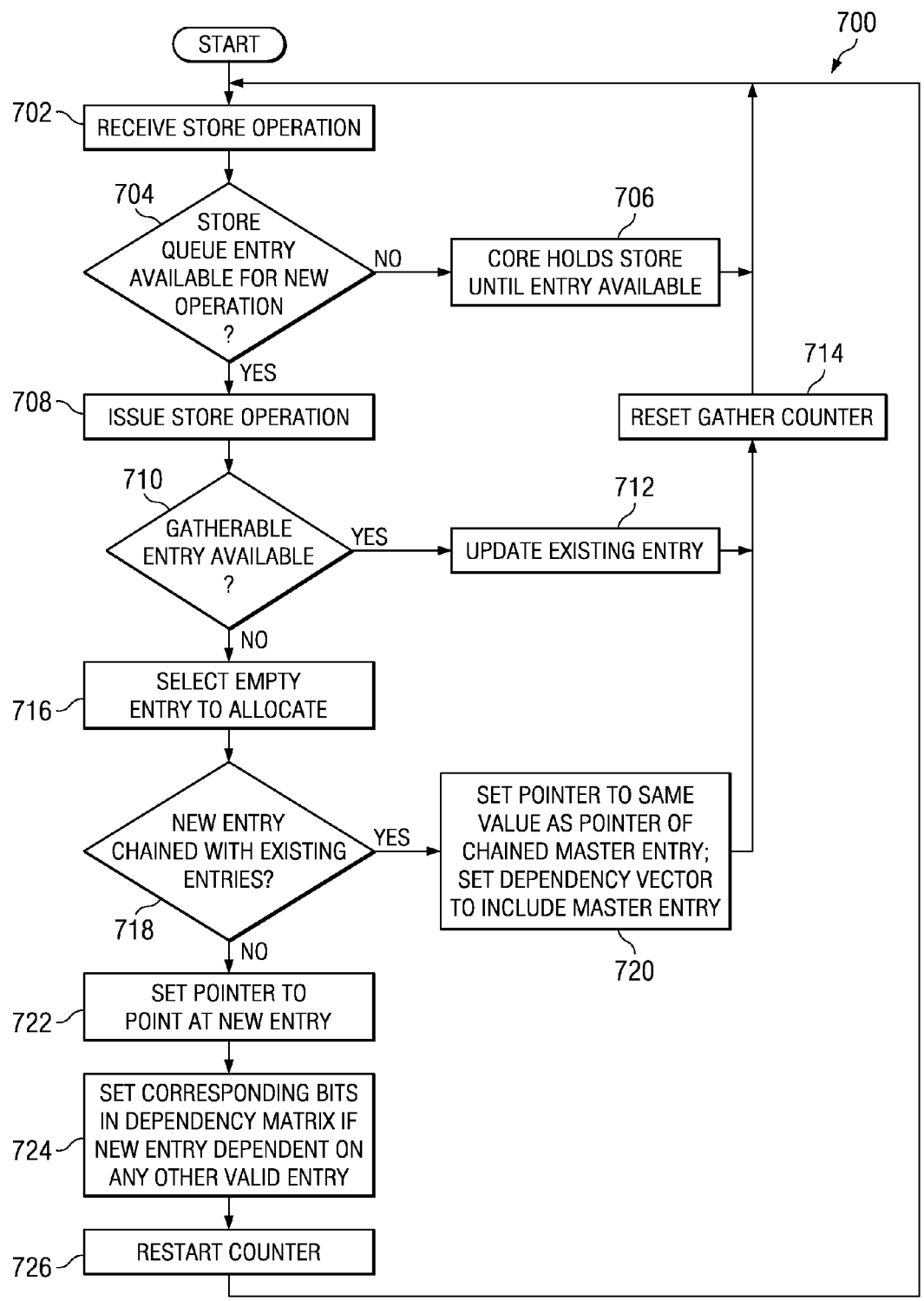
FIG. 7 is a high-level logical flowchart for writing a new store queue entry in response to a store queue receiving a new store operation from a processor core according to an illustrative embodiment.

Referring now to FIG. 7, a high-level logical flowchart for writing a new store queue entry in response to a store queue receiving a new store operation from a processor core is shown according to an illustrative embodiment. Process 700 is a write process occurring on processor chip 601 of FIG. 6.

Process 700 begins by receiving a store operation originating from a processor core (step 702). Responsive to receiving the store operation, process 700 determines if a store queue entry is available for the new store operation (step 704). A store queue entry is available if empty entries are available to hold the new store operation.

If process 700 determines that a store queue entry is not available for the new store operation ("no" at step 704), process 700 sends a message instructing the processor core to halt the sending of store operations until some entries have been dispatched by read-claim dispatch logic. The processor core then holds store operations for that store queue until an entry in the store queue becomes available (step 706).

If process 700 determines if a store queue entry is available for the new store operation ("yes" at step 704), process 700 issues the new store operation (step 708). When the store operation is received at the store queue, process 700 determines whether a gatherable entry (i.e., a previously existing entry) for the same cache line address is currently available for gathering the store operation (step 710). Gathering of store operations involves a series of store operations writing to the same cache line in the store queue that are absorbed by the store queue entry before the line is dispatched to the L2cache, as previously described. If process 700 determines that gatherable entry is available for the new store operation ("yes" at step 710), process 700 updates the gatherable entry with data of the new store operation (step 712). Process 700 then resets the gather counter for the entry, and all chained entries (step 714). Process 700 then returns to step 710 and continues in an iterative fashion.

The gather counter is a cycle, or clock counter. A gather counter is provided for each entry in the storage queue. The gather counter prevents entries in the store queue from languishing indefinitely while the store queue controller attempts to completely fill each data register within the entry. Once the gather counter has reached a predetermined number of counts, the associated entry in the store queue is processed for dispatch, despite the possible existence of data registers therein which are not completely filled.

Returning to step 710, if process 700 determines that a gatherable entry for the new store operation does not exist ("no" at step 710), process 700 allocates data corresponding to the new store operation into an empty entry within the store queue (step 716). The new data, address, and byte enable data corresponding to the new store operation is inserted into the new store queue entry.

Responsive to selecting an empty entry to allocate the new store operation, process 700 determines whether the new entry can be chained with any other existing entries (step 718). If the new entry can be chained with any other existing entries ("yes" at step 718), process 700 sets the pointer for the new entry to the same value as the pointer of the chained master entry (step 720). The dependency vector of the new entry is set to include the master entry. Process 700 then returns to step 714 in an iterative fashion.

Returning now to step 718, if the new entry cannot be chained with any other existing entries ("no" at step 718), process 700 sets the pointer for the new entry to point at the new entry (step 722). By setting the pointer for the new entry to point at itself, process makes the new entry is a "master entry." Process 700 then sets any corresponding bits in the dependency matrix, if the new entry is dependent on any other valid entry (step 724).

In one illustrative embodiment, only a master entry can request dispatch to the read-claim machine. This prevents multiple entries chained together within the queue store from each requesting dispatch.

The bits set in the dependency matrix correspond to valid entries in the store queue having a dependent relationship with the new entry (where the new entry is dependent on the other valid entries). A new entry is dependent on another store queue entry if, among other things, the store operation characterized by the new entry requires an access to the same address as the other store queue entry or must be synchronized with the other store queue entry's store operation. For example, as earlier described in conjunction with FIG. 6, if for a new store operation, write select pointer 604 updates store queue entry 0, and store queue controller 605 determines that entry 0 is dependent on entry 1, store queue controller 605 will enter a "1" into row 0, column 1 of dependency matrix 608 while entering a "0" in the rest of the columns in row 0, provided that entry 0 is not dependent on any other entry in store queue 607.

Responsive to setting any corresponding bits in the dependency matrix, process 700 restarts the gather counter for the new entry (step 726). Process 700 then returns to step 710 in an iterative fashion.

Figure 8:
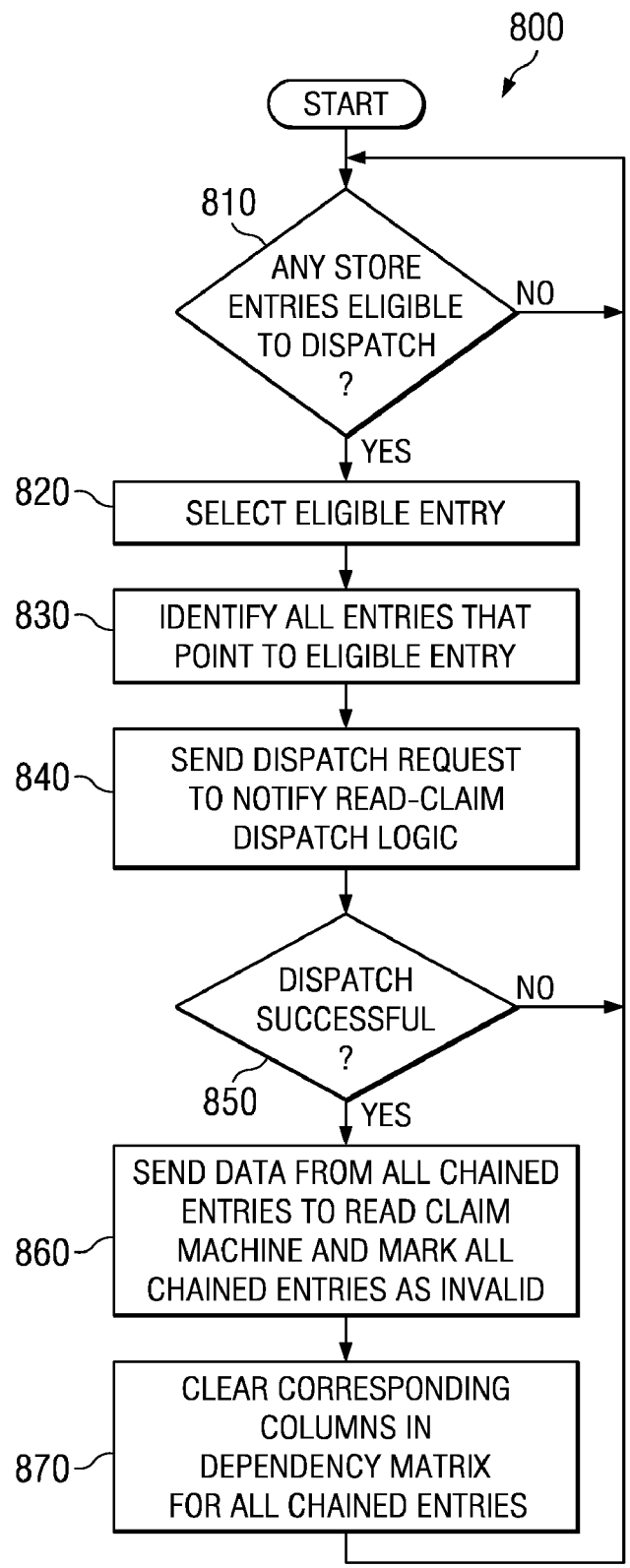
FIG. 8 is a high-level logical flowchart depicting the operation of arbitration logic to request a single store queue entry or a chain of store queue entries to be dispatched by the store queue controller logic to the read-claim dispatch logic according to an illustrative embodiment.

Referring now to FIG. 8, a high-level logical flowchart depicting the operation of arbitration logic to request a single store queue entry or a chain of store queue entries to be dispatched by the store queue controller logic to the read-claim dispatch logic is shown according to an illustrative embodiment. Process 800 executes on a store queue controller, such as store queue controller 605 of FIG. 6. Process 800 is an example of arbitration logic 606 of FIG. 6.

Process 800 begins by determining if any store queue entries are eligible for dispatch (step 810). As previously discussed, a store entry is eligible for dispatch when (1) the valid bit is set; (2) the store queue controller has determined that the entry has completed gathering associated store operations; and (3) all dependencies related to the entry have been cleared (e.g., all values in the entry's associated row in the dependency matrix, such as dependency matrix 208 of FIG. 2, have been set to "0").

If process 800 determines that no entries in the store queue are available for dispatch ("no" at step 810), process 800 iterates at step 810. However, if at least one entry in the store queue is available for dispatch ("yes" at step 810), process 800 selects the eligible entry for dispatch (step 820). Those skilled in this art will appreciate that any selection algorithm may be utilized to select one eligible entry for dispatch. Some examples of commonly utilized algorithms are round-robin or random, but are not limited to these algorithms.

Process 800 then identifies all entries that point to the entry eligible for dispatch (step 830). The entry eligible for dispatch is a master entry. Process 800 therefore identifies any other entry that has been chained to the master entry. In one illustrative embodiment, process 800 identifies each chained entry by examining the pointer for each entry in the store queue. If the pointer for a particular entry points back to the master entry eligible for dispatch and is valid, then that particular entry is identified as being chained to the master entry.

Process 800 then sends a dispatch request to the read-claim dispatch logic, notifying the read-claim dispatch logic of the number of entries to be dispatched (step 840). The dispatch request requests the dispatch logic to dispatch the master entry and the other entries chained thereto to a read-claim machine to be committed into the cache for execution.

Process 800 then determines whether the dispatch of the entry was successful (step 850). As previously discussed, the read-claim dispatch logic sends a "dispatch complete" signal to the store queue controller after a successful dispatch of a store operation associated with an entry in the store queue.

If process 800 determines that the dispatch of the entry is not successful ("no" at step 850), process 800 returns to step 810 and proceeds in an iterative fashion. If, however, process 800 determines that the dispatch of the entry was successful ("yes" at step 850), process 800 then sends the data associated with all of the chained entries to a read-claim machine for processing, and marks all of the dispatched chained entries as invalid in the associated valid bit field (step 860). Process 800 then returns to step 810 and proceeds in an iterative fashion.

Process 800 then clears the corresponding columns in the dependency matrix for each of the dispatched chained entries (step 870). Process 800 then returns to step 810 and proceeds in an iterative fashion.

Thus, the illustrative embodiments allows for smaller sized store queue entries to be chained together so that they can act as one large sized entry or as multiple individual entries dynamically. This allows for the store queue to allocate a greater number of smaller queue entries when the processor is doing a random workload. Conversely, when the processor is doing scientific workloads where the store stream is ordered, multiple queue entries can be chained together to dispatch into one read-claim machine. Allowing the store queue to dynamically allocate entries and chaining them as needed results in less wasted store queue buffers space and the flexibility to change between random and scientific workloads.

Each store queue has a smaller size than a full cache line, with the ability to chain enough entries up to a full cache line worth of data. Chaining is implemented with the addition of a pointer to each store queue entry. The pointer can point to any other entry in the store queue, including itself. When the store queue allocates a new entry, the new entry sets its pointer to point at itself. It is now considered a "master" entry. If the new entry can chain with an existing older entry or entries, then the point is set to the same value as the entry's or entries' pointer values. Since all entries that cluster together will always have their pointers pointing at the master entry is no conflict is present.

The dependency vector is a vector of all the valid entries an entry is ordered against based on architectural ordering rules. The rules dictate which entry must be dispatched to the read-claim machines first before entry is eligible to dispatch. With store chaining, all chained entries are dependent on the master entry. This means only the master entry can make a dispatch request to the read-claim machines. When the master entry makes a dispatch request to the read-claim machines, the entry looks up all the entries with itself as the pointer and sends the read-claim machine the master entry and all chained entries dispatches to the read-claim together and is de-allocated from the store queue.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method in a data processing system for processing information in a store cache of a data processing system, the method comprising:
   receiving a first store operation from a processor at a store queue, the first store operation comprising a first address indicating a first segment of a cache line;
   responsive to receiving the first store operation, comparing the first address to a second address of a second entry within the store queue, wherein the second address indicates a second segment of the cache line;
   responsive to the first segment address not being equal to the second segment address, chaining by a store queue controller, the first store operation as a first entry to the second entry, wherein the first entry comprises a first pointer, wherein the step of chaining the first entry to the second entry comprises: setting, by the store queue controller, the first pointer to identify the second entry;
   responsive to the first address being equal to the second address, determining whether a gather counter for the second entry has elapsed; and responsive to determining that the gather counter for the second entry has not elapsed, gathering the first store operation into the second entry; and
   responsive to determining that the gather counter for the second entry has elapsed, entering the first store operation as a new entry in the store cache without chaining the new entry to the second entry.

2. The computer implemented method of claim 1, the new entry comprising a second pointer, the method further comprising: responsive to receiving the first entry entering the first store operation as a new entry in the store cache, setting, by the store queue controller, the second pointer to identify the new entry.

3. The computer implemented method of claim 1, further comprising:
responsive to determining that the gather counter for the second entry has elapsed, determining whether all the dependencies associated with the second entry of the store queue have been cleared; and
responsive to determining that all the dependencies associated with the second entry of the store queue have been cleared, marking the second entry as available for dispatch to a read-claim machine to be committed into a cache for execution.

4. The computer implemented method of claim 1, wherein both the first segment and the second segment are a fraction of a maximum cache line size utilizable by a read-claim machine.

5. A processor chip for processing information in a store cache of a data processing system, the processor chip including:
a processor core;
a store queue controller with a store queue;
a read-claim dispatch logic; and
microcode for processing information in the store queue of a data processing system, the microcode comprising microcode for receiving a first store operation from a processor at a store queue, the first store operation comprising a first address indicating a first segment of a cache line, microcode for, responsive to receiving the first store operation, comparing the first address to a second address of a second entry within the store queue, wherein the second address indicates a second segment of the cache line, and responsive to the first segment not being equal to the second segment, microcode for, responsive to the first address not being equal to the second address, chaining, by the store queue controller, the first store operation as a first entry to the second entry;
wherein the first entry comprises a first pointer, wherein the chaining the first entry to the second entry comprises: setting, by the store queue controller, the first pointer to identify the second entry;
microcode for, responsive to the first address being equal to the second address, determining whether a gather counter for the second entry has elapsed; and responsive to determining that the gather counter for the second entry has not elapsed, gathering the first store operation into the second entry; and
microcode for, responsive to determining that the gather counter for the second entry has elapsed, entering the first store operation as a new entry in the store cache without chaining the new entry to the second entry.

6. The processor chip of claim 5, further comprising:
wherein the new entry comprises a second pointer, the microcode for processing information in the store queue of a data processing system of the processor chip further comprising:
responsive to entering the first store operation as a new entry in the store cache, setting, by the store queue controller, the second pointer to identify the new entry.

7. The processor chip of claim 5, wherein both the first segment and the second segment are a fraction of a maximum cache line size utilizable by a read-claim machine.

8. A data processing system comprising:
a bus;
a communications unit connected to the bus;
a storage device connected to the bus, wherein the storage device includes computer usable program code; and
a plurality of processors, each of said plurality of processors comprising:
a processor core;
a store queue controller with a store queue;
a read-claim dispatch logic; and
microcode for processing information in the store queue of a data processing system, the microcode comprising microcode for receiving a first store operation from a processor at a store queue, the first store operation comprising a first address indicating a first segment of a cache line, microcode for, responsive to receiving the first store operation, comparing the first address to a second address of a second entry within the store queue, wherein the second address indicates a second segment of the cache line, and responsive to the first segment not being equal to the second segment, microcode for, responsive to the first address not being equal to the second address, chaining, by the store queue controller, the first store operation as a first entry to the second entry;
wherein the first entry comprises a first pointer, wherein the chaining the first entry to the second entry comprises: setting, by the store queue controller, the first pointer to identify the second entry;
microcode for, responsive to the first address being equal to the second address, determining whether a gather counter for the second entry has elapsed; and responsive to determining that the gather counter for the second entry has not elapsed, gathering the first store operation into the second entry; and
microcode for, responsive to determining that the gather counter for the second entry has elapsed, entering the first store operation as a new entry in the store cache without chaining the new entry to the second entry.

9. The data processing system of claim 8, further comprising:
wherein the new entry comprising comprises a second pointer, the microcode for processing information in the store queue of a data processing system of the processor chip further comprising:
responsive to receiving the first entry entering the first store operation as a new entry in the store cache, setting, by the store queue controller, the second pointer to identify the new entry.

10. The data processing system of claim 8, wherein both the first segment and the second segment are a fraction of a maximum cache line size utilizable by a read-claim machine.

11. A computer program product encoded on a non-transitory computer usable medium for emulating a processor chip for processing information in a store cache, the computer program product comprising:
computer usable program code for receiving a first store operation from a processor at a store queue, the first store operation comprising a first address indicating a first segment of a cache line;
computer usable program code, responsive to receiving the first store operation, for comparing the first address to a second address of an second entry within the store queue, wherein the second address indicates a second segment of the cache line; and
computer usable program code, responsive to the first address not being equal to the second address, for chaining, by a store queue controller, the first store operation as a first entry to the second entry;

wherein the first entry comprises a first pointer, wherein the chaining the first entry to the second entry comprises: setting, by the store queue controller, the first pointer to identify the second entry;

computer usable program code, responsive to the first address being equal to the second address, determining whether a gather counter for the second entry has elapsed; and responsive to determining that the gather counter for the second entry has not elapsed, gathering the first store operation into the second entry; and computer usable program code, responsive to determining that the gather counter for the second entry has elapsed, entering the first store operation as a new entry in the store cache without chaining the new entry to the second entry.

12. The computer program product of claim 11, further comprising:

wherein the new entry comprises a second pointer, the computer program product further comprising:

computer usable program code, responsive to entering the first store operation as a new entry in the store cache, for setting the second pointer to identify the new entry.

13. The computer program product of claim 11, wherein both the first segment and the second segment are a fraction of a maximum cashe line size utilizable by a read-claim machine.

* * * * *